(12) United States Patent
Fabiani

(10) Patent No.: US 6,769,411 B2
(45) Date of Patent: Aug. 3, 2004

(54) NOZZLE AIR INJECTION SYSTEM FOR A FUEL-INJECTED ENGINE

(76) Inventor: Sandor C. Fabiani, 110 Phillip St., Feasterville, PA (US) 19053

( * ) Notice: Subject to any disclaimer, the term of this patent is extended or adjusted under 35 U.S.C. 154(b) by 0 days.

(21) Appl. No.: 10/251,824

(22) Filed: Sep. 23, 2002

(65) Prior Publication Data

US 2004/0055579 A1 Mar. 25, 2004

(51) Int. Cl.⁷ ............................................. F02B 33/00
(52) U.S. Cl. ...................... 123/478; 123/542; 123/563; 123/564
(58) Field of Search ............................... 123/478, 531, 123/559.1, 563, 564, 585, 592, 699; 60/598, 611, 608

(56) References Cited

U.S. PATENT DOCUMENTS

| | | | |
|---|---|---|---|
| 2,839,038 A | | 6/1958 | Middlebrooks, Jr. |
| 3,177,633 A | | 4/1965 | McDonald, Jr. |
| 3,958,544 A | | 5/1976 | Shinoda et al. |
| 4,014,303 A | | 3/1977 | Aiti |
| 4,020,815 A | | 5/1977 | Hubert |
| 4,047,842 A | | 9/1977 | Avena et al. |
| 4,058,096 A | | 11/1977 | Brown |
| 4,059,082 A | * | 11/1977 | McCauley .................. 123/549 |
| 4,235,209 A | | 11/1980 | Ibbott |
| 4,441,476 A | | 4/1984 | Roberts et al. |
| 4,517,941 A | | 5/1985 | Nakagawa |
| 4,557,241 A | | 12/1985 | Kawachi et al. |
| 4,724,817 A | * | 2/1988 | Cook ......................... 123/565 |
| 4,894,991 A | * | 1/1990 | Kawamura .................. 60/608 |
| 4,998,951 A | * | 3/1991 | Kawamura .................. 60/608 |
| 5,036,808 A | * | 8/1991 | Stumpp ................... 123/198 D |
| 5,509,397 A | | 4/1996 | Hoshi |
| 5,586,540 A | * | 12/1996 | Marzec et al. ........... 123/559.1 |
| 5,606,951 A | | 3/1997 | Southern et al. |
| 5,623,904 A | | 4/1997 | Matsumoto |
| 5,636,619 A | | 6/1997 | Poola et al. |
| 5,871,001 A | | 2/1999 | Pelkey |
| 6,067,973 A | | 5/2000 | Chanda et al. |
| 6,205,787 B1 | * | 3/2001 | Woollenweber et al. ...... 60/612 |
| 6,209,508 B1 | | 4/2001 | Tinney |
| 6,295,974 B1 | | 10/2001 | McCants |
| 6,505,613 B1 | * | 1/2003 | Albertson .................... 123/533 |

FOREIGN PATENT DOCUMENTS

| | | |
|---|---|---|
| JP | 57129234 A | 8/1982 |
| JP | 60008418 A | 1/1985 |
| JP | 62271931 A | 11/1987 |

* cited by examiner

*Primary Examiner*—Hai Huynh
(74) *Attorney, Agent, or Firm*—Richard C. Litman

(57) ABSTRACT

A nozzle air injection (NAI) system and algorithm for a fuel-injected engine for increasing the flow of air into the engine. In one embodiment the NAI system takes the form of a kit comprising a controller, engine speed and throttle position sensors, a power regulator, an air compressor adapted to be rotatably driven by an electric motor to drive additional air into the engine. The controller includes a processor and sufficient memory to perform the logic steps necessary to selectively operate the compressor. In one embodiment, the controller checks the status of engine speed and throttle deflection and if the engine speed is equal or less than a first threshold value, and if the throttle deflection is greater than or equal to a second threshold value the controller instructs the regulator to send electrical power to the motor to drive the compressor to provide additional air to the engine.

12 Claims, 10 Drawing Sheets

NOZZLE AIR INJECTION SYSTEM FOR A FUEL-INJECTED ENGINE

BACKGROUND OF THE INVENTION

1. Field of the Invention

The present invention relates to an apparatus and a control algorithm for selectively increasing the flow of air into a fuel injected engine to selectively improve power output, and particularly to the selective operation of an air compressor which is disposed in the air intake duct of a fuel injected engine and operated under the direction of a controller unit, wherein the controller unit operates under the direction of the control algorithm.

2. Description of the Related Art

Improving the efficiency and power output of an internal combustion engine has been a long term goal for engine manufacturers and users alike, both in the automobile industry and other sectors such as power boats, motorcycle, and farming sectors.

In seeking greater fuel efficiency and lower emissions, there has been a trend away from engines that rely on carburetors to mix fuel and air. Fuel injection systems are increasingly used in modern cars powered by internal combustion engines, and most cars sold in the United States have fuel injection systems. Fuel injection has been widely used in European cars since about 1980.

From time to time most car or automobile vehicle owners and drivers desire more horsepower from their vehicle's engine. Some drivers desire high horsepower at all times from their vehicle's engine. Other drivers, perhaps mindful of fuel and maintenance costs, desire extra power output from their vehicle's engine when pulling a heavy load, e.g., towing a caravan up a steep incline.

Owners or operators of a genuinely underpowered vehicle, such as an underpowered motor vehicle, or an underpowered water vehicle, such as an underpowered cabin cruiser, have a particular need for extra power output when the underpowered apparatus is under heavy load, e.g., when an underpowered cabin cruiser is moving against a fast flow of water and when an underpowered car is towing a heavy load up a hill. Thus, there is a long felt need for a means to increase the horsepower output from an engine but only when the driver desires more horsepower and when it is beneficial to the owner and vehicle to have more horsepower. Selectively increasing power output from an otherwise low power output engine can offer several advantages over replacing the engine with a bigger engine, e.g. savings on fuel and maintenance costs.

Several efforts have been made to address these problems. U.S. Pat. No. 2,839,038, issued Jun. 17, 1958 to C. E. Middlebrooks Jr., shows a supercharger for pressurizing an air fuel mix for an internal combustion engine and is adapted to be driven by one of a plurality of drive means. The supercharger design of the '038 patent is not adapted to work with a control box containing software logic to vary the performance of the '038 supercharger. Thus, the '038 supercharger is not adapted to selectively provide additional power output particularly when the engine is under heavy load.

U.S. Pat. No. 3,177,633, issued Apr. 13, 1965 to L. L. McDonald, Jr., describes an oxygen enricher for combustion engines. The '633 patent oxygen enricher is claimed to enrich the gas delivered to the carburetor of an internal combustion engine by allegedly differentiating between the peculiar paramagnetic property claimed for oxygen verses the claimed property of diamagnetism for other gases. Regardless of the merits positive or otherwise of the '633 oxygen enricher, the '633 oxygen enricher does not address or solve the problem of varying the output of an internal combustion engine in accordance with the variable demands placed on the engine.

U.S. Pat. No. 4,014,303, issued Mar. 29, 1977 to G. Aiti, shows a device for improved efficiency in internal combustion engines of motor-vehicles, comprising an air compressor supplying air downstream of the engine carburetor to which the device is applied. The air passage is controlled by a valve connected to the carburetor throttle. Downstream of the carburetor is a propeller which is rotatably driven by air supplied from the compressor and atomizes the fuel perfectly for mixing it with air. The requirement for an air compressor and a propeller adds to the cost of manufacture and maintenance. In addition, the '303 device takes no account of the trend away from carburetors towards fuel injected engines.

U.S. Pat. No. 4,020,815, issued May 3, 1977 to R. D. Hubert, shows an air heater and blower system incorporated into an air filter for an internal combustion engine carburetor. Heated air is blown into the filter and into the carburetor under control of a thermostat. The air filter has an opening and a deflector plate to deflect some of the heated air against the carburetor and bowl beneath the filter so as to accumulate heat around the carburetor under the filter casing thereby increasing the efficiency of the engine in cold weather or when the temperature drops below the setting of the thermostat. The '815 device takes little or no account of the modern trend away from engines with carburetors to fuel injected engines or improving power output from fuel injected engines subjected to heavy load. In addition, the '815 device usefulness is at least partially limited to cold climate areas where engines are required to make numerous cold starts.

U.S. Pat. No. 4,058,096, issued Nov. 15, 1977 to S. E. Brown, shows an apparatus and method for increasing the effective horsepower of an internal combustion engine. The apparatus consists of a cooling chamber mounted so as to be in communication with the air inlet portion of the carburetor of the engine. Ambient air is substantially cooled prior to introduction into the carburetor to quantitatively increase the weight of oxygen in the volume of air introduced into the carburetor. This makes it possible to feed an additional amount of fuel to the engine while maintaining the optimum air-fuel ratio, thereby effectively increasing the horsepower obtainable from the engine. While the '096 device addresses the need to increase effective horsepower output from an internal combustion engine, the device's usefulness in modern engines is severely limited given the modern trend towards fuel injected internal combustion engines.

U.S. Pat. No. 4,235,209, issued Nov. 25, 1980 to J. K. Ibbott, teaches introducing additional air into an air-fuel mixture flowing through an intake passage to combustion chambers of an internal combustion engine, together with a means for maintaining the pressure of the additional air or gas introduced into the intake passage to more than twice as high as the internal pressure in the intake passage. The '209 device further includes a multiple orifice unit comprising a plurality of annular-shaped plates stacked in layers wherein the gap between each pair of annular plates should be less than 0.35 mm. While the '209 device addresses the issue of improving the flow of air into the intake passage leading to the combustion chamber, the device works best with a carburetor, thereby decreasing the device's usefulness in modern engines given the modern trend towards fuel injected internal combustion engines.

U.S. Pat. No. 4,517,941, issued May 21, 1985 to N. Nakagawa, shows an air introduction system of a fuel injection type engine, including a main passage and a fuel injector for injecting fuel into the main passage. Assist air is introduced to the surrounding of a top nozzle portion of the fuel injector so that the assist air acts on the fuel injected from the injector. A sub-passage is connected to the main passage so as to supply the assist air. A main valve is disposed in the main passage and a subvalve is disposed in the sub-passage. The main and sub-passages are formed in a single throttle body. The assist air generated by the '941 device is supplied to a top nozzle portion of a fuel injector so as to improve the atomization of injected fuel. While the '941 device addresses the issue of improving engine efficiency in fuel injected internal combustion engines, the device does not address the issue of increasing the effective horsepower of the engine.

U.S. Pat. No. 4,557,241, issued Dec. 10, 1985 to M. Kawachi et al., shows a fuel injection device for improving the effective atomization of fuel in a supercharged engine. The '241 devices includes a supercharging blower located in the intake passage upstream of a throttle valve. The fuel injection device includes a fuel injection valve located downstream of the throttle valve. An air bleed system is provided so as to inject bleed air to the fuel injected from the fuel injection valve. The air bleed system includes a bleed air passage having an upstream end opening to the intake passage between the supercharging blower and the throttle valve to prevent backflow through the bleed air passage. While the '241 device addresses the issue of effective atomization of fuel the device does not the device does not address the issue of increasing the effective horsepower of the engine according to the preferences of the operator of the engine and the load placed on the engine.

U.S. Pat. No. 5,606,951, issued Mar. 4, 1997 to M. P. Southern et al., shows a method of controlling the air supply to an internal combustion engine having a means to throttle the airflow to the engine comprising determining the air demand in response to a driver initiated signal; determining an initial position of the throttle means in response to the driver initiated signal; determining the actual rate of air supply and comparing the actual rate of air supply with the determined air demand; moving the throttle means to the initial position, the position of the throttle means being adjusted to bring the actual air supply within acceptable operating limits of the determined air demand. The '951 invention is devoted to improving air efficiency by manipulating the throttle means to increase or decrease air supply to the engine. The '951 invention does not adequately address the need for a device which actively rams air into the engine in response to engine load, speed and an operator initiated signal.

U.S. Pat. No. 6,295,974 B1, issued Oct. 2, 2001 to D. A. McCants, shows a device in the form of an electric turbine installed between an air filter and carburetor of an internal combustion motorcycle engine for increasing intake air compression. A rotor member is driven by an electric motor connected to the rotor by a belt driver. The electric motor power supply originates from electricity generated by the motorcycle alternator. The turbine RPM is regulated by the power supply voltage provided to the electric motor by a coil attachment to the motorcycle alternator. The '974 device take no account of the different operational requirements of a fuel injected engine which lacks a carburetor. In addition, though the rotation speed of the rotor member is varied depending on engine speed, the rotor member is continuously driven by the electric motor regardless of load conditions placed on the engine.

Other patents showing devices for modifying the input of air into an internal combustion engine, but which also do not suggest a method and apparatus to vary the power output of an engine according to the claimed invention, include U.S. Pat. No. 3,958,544, issued May 25, 1976 to K. Shinoda and H. Koide (an air-fuel ratio control device for internal combustion engines); U.S. Pat. No. 4,441,476 issued Apr. 10, 1984 to J. E. Roberts et al. (charge air cooling assembly); U.S. Pat. No. 5,509,397 issued Apr. 23, 1996 to K. Hoshi (air supply system preventing backflow); U.S. Pat. No. 5,623,904 issued Apr. 29, 1997 to H. Matsumoto (air-assisted fuel injection system); U.S. Pat. No. 5,636,619 issued Jun. 10, 1997 to R. B. Poola et al. (method and apparatus for reducing cold-phase emissions by utilizing oxygen-enriched intake air); U.S. Pat. No. 5,871,001 issued Feb. 16, 1999 to J. E. Pelkey (method and apparatus for air-intake cooling in an internal combustion chamber engine); U.S. Pat. No. 6,067,973 issued May 30, 2000 to A. A. Chanda et al. (method and system for late cycle oxygen injection in an internal combustion engine); U.S. Pat. No. 6,209,508 issued Apr. 3, 2001 to J. F. Tinney (four-cycle fuel-lubricated internal combustion engine); Japanese Patent No. 57129234 A published Aug. 11, 1982 to inventor Iwata Minoru (Applicant: Toyota Motor Corp., air suction device in fuel injection type internal combustion engine); Japanese Patent No. 60008418 A published Jan. 17, 1985 to inventor Hirota Toshio (Applicant: Nissan Motor Corp., intake-air temperature regulating device in internal-combustion engine); and Japanese Patent No. 62271931 A published Nov. 26, 1987 to inventor Hori Shigeyuki (Applicant: Toyota Motor Corp., intake air cooling device for internal combustion engine).

None of the above inventions and patents, taken either singly or in combination, is seen to describe the instant invention as claimed. Thus a nozzle air injection system for a fuel-injected engine solving the aforementioned problems is desired.

SUMMARY OF THE INVENTION

The present invention is a nozzle air injection (NAI) system in combination with a control algorithm for selectively increasing the flow of air, and hence increase power output, into a fuel injected engine. In one embodiment the NAI system takes the form of a kit comprising a controller, engine speed and throttle position sensors, a current regulator, and an air compressor adapted to be rotatably driven by an electric motor to drive additional air into the engine. The controller includes a processor and sufficient memory to perform the logic steps necessary to selectively operate the compressor. In one embodiment, the controller checks the status of engine speed and throttle deflection and if the engine speed is equal or less than a first threshold value, and if the throttle deflection is greater than or equal to a second threshold value the controller instructs the regulator to send electrical power to the motor to drive the compressor to provide additional air to the engine.

Accordingly, it is a principal aspect of the invention to selectively increase airflow to the engine by selectively operating a compressor.

In one embodiment of the invention a compressor is rotatably driven by an electric motor under the direction of a controller.

It is a further aspect of the invention to provide an algorithm for selectively controlling the operation of the compressor in real time in response to engine speed and throttle deflection.

It is yet a further aspect of the invention to provide an algorithm for selectively controlling the operation of an air compressor in combination with the selective opening and blocking of a compressor bypass passageway in real time in response to engine speed and throttle deflection.

Still another aspect of the invention is to selectively compress the air supplied to the fuel injected engine by selectively varying the pitch of at least one set of variable pitch blades.

In a further embodiment of the invention, the degree of pitch of at least one set of variable pitch blades is selectively controlled in response to engine speed and throttle deflection.

These and other objects of the present invention will become readily apparent upon further review of the following specification and drawings.

DETAILED DESCRIPTION OF THE PREFERRED EMBODIMENTS

Figure 1:
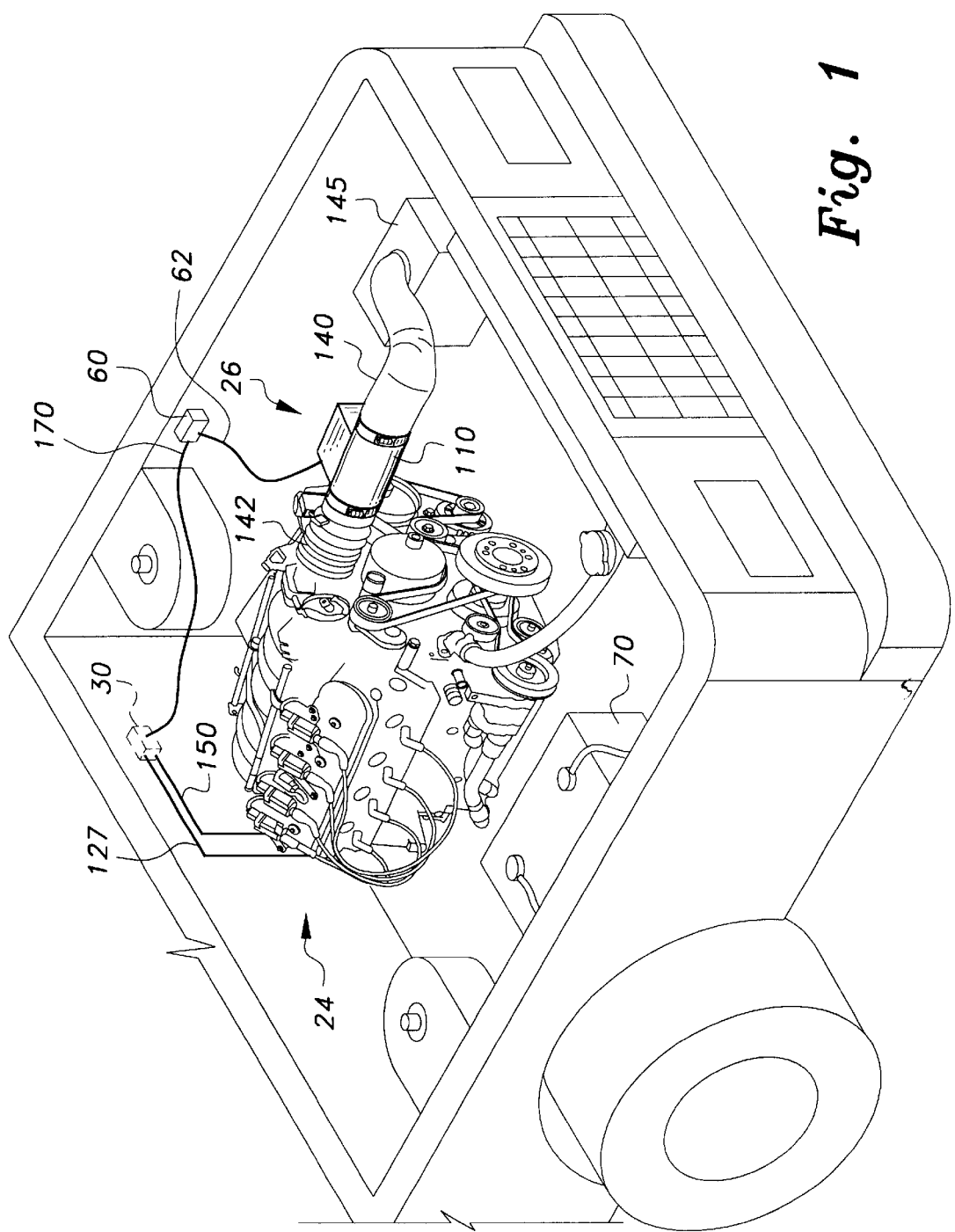
FIG. 1 is an environmental, perspective view of a nozzle air injection system for a fuel-injected engine according to the present invention.

The present invention is a nozzle air injection system ("the NAI system") and a compressor control algorithm designated generally as 20 and 22, respectively. The NAI system 20 is adapted to fit a fuel injected engine 24, and more particularly the fuel injected engine 24 of an automobile as depicted in FIG. 1. The NAI system 20 includes a controller 30 adapted to store and run the algorithm 22, which is used to control the operation of an air compressor 26 to increase air input into the engine 24 and thereby generate additional horsepower from the engine 24.

Figure 2:
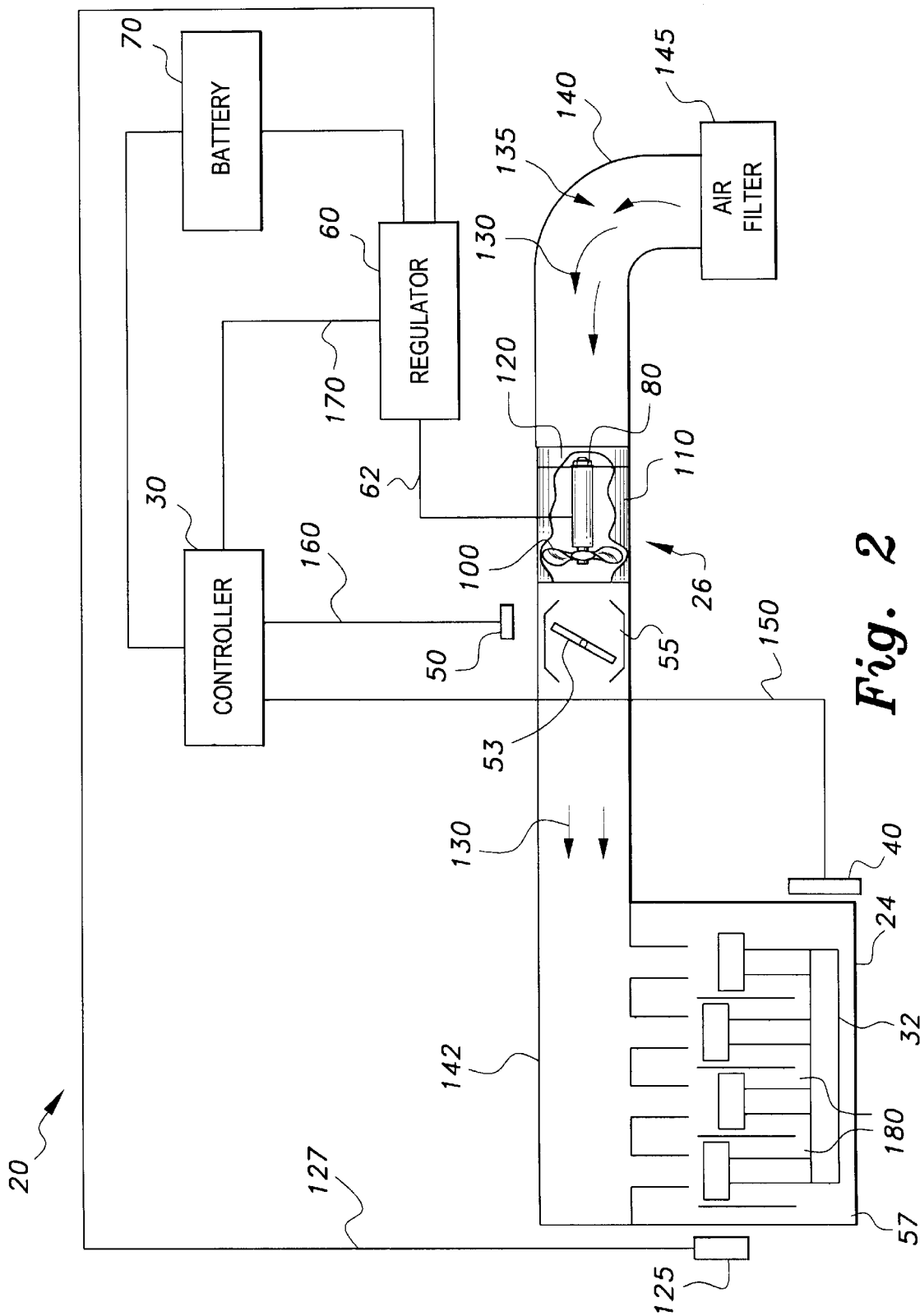
FIG. 2 is a schematic plan view of a nozzle air injection system for a fuel-injected engine according to the present invention with a rotatable compressor directly driven by an electric motor under the direction of a controller in communication with an engine speed and throttle position sensors.

Referring to FIG. 2, a nozzle air injection system 20 according to one aspect of the invention is shown schematically. A controller 30 adapted to perform logical operations is connected to a crankshaft sensor 40, a throttle position sensor 50 (which measures throttle deflection of throttle 53), a power regulator 60, and a battery 70, which in one embodiment supplies electrical power to the controller 30. The power regulator 60 is further connected to an electric motor 80 and battery 70. The electric motor 80 is operably coupled to an air compressor 26 via line 62, which in one embodiment comprises a propeller 100; the propeller 100 is rotatably driven by the electric motor 80 when current is applied to the motor 80 by the battery 70 via regulator 60 under the direction of the controller 30. It should be understood that the power regulator 60 is adapted to vary the power of the current delivered to the motor 80; the power regulator 60 preferably varies the amperage of the current, but might instead vary the voltage and/or the amperage of the current delivered to the motor 80, e.g., the regulator 60 may cut off the current entirely by reducing the amperage to zero amps thereby cutting off current to the motor 80. In one embodiment, the motor 80 is a 12 volt D.C. motor.

Still referring to FIG. 2, the compressor 26 is housed in a compressor chamber housing 110, which comprises at least one cross member 120. The cross member 120 allows substantially unrestricted airflow 130 while holding the motor 80 in place. In the preferred embodiment the at least one cross member 120 takes the form of at least one flat metal member adapted to hold the motor 80 in place inside housing 110 and positioned end on with respect to the airflow 130 to minimize friction losses. The propeller 100 is shown located inside air intake duct 140 and upstream of throttle body 55, which is adapted to house throttle 53. The housing 110, throttle body 55 and duct passage 142 leading to the engine from the compressor 100 should be as air tight as possible to minimize and prevent as far as practical inadvertent energy losses caused through compressed air leaking to the outside atmosphere.

Still referring to FIG. 2, the controller 30 monitors signal inputs from the crankshaft sensor 40 via line 150, and throttle position sensor 50, via line 160; and optionally, inputs from a temperature sensor 125 via line 127. In response to the input signals (see Tables 1 through 4, infra), the controller 30 adjusts the power regulator 60, by sending a signal along line 170, to regulate the current (by varying amperage and/or voltage, preferably amperage of the current) delivered to the electric motor 80 from the battery 70. When regulator 60 blocks current the electric motor 80 is not able to rotate propeller 100 and no work is done compressing the airflow 130 incident on the propeller 100 and airflow 130 is not increased. When the regulator 60 allows current to flow to the motor 80 to rotatably drive the propellor 100 the air 135 in air intake duct 140 is compressed and driven forward into duct 142 and then into the combustion chambers 180 of the engine where the compressed air is mixed with fuel injected by fuel injectors (not shown).

Controller 30 may be any known microprocessor integrated circuit including a process unit and memory. The memory may include random access memory (RAM), read only memory (ROM), erasable programable ROM (EPROM) and a data storage memory. In a preferred embodiment, the ROM stores operational software code 22 that is read and processed by the controller 30 for the operation of the NAI system 20, and in particular the operational status of air compressor 26 by controlling power regulator 60, which supplies electrical power to the electric motor 80 under the direction of the controller 30.

Such software code preferably includes the NAI system 20 operating system which contains software code to successfully operate all elements of the NAI system 20 described herein. Thus, controller 30 controls or monitors plurality of members which make up the NAI system 20, including the power regulator 60 and to process input signals received from the engine speed, throttle position and engine temperature sensors: 40, 50, and 125, respectively.

The controller 30 controls the power regulator either directly or indirectly via a control bus (not shown). The controller 30 may further comprise RAM memory for storing system parameters and encoded communication data and line buffers for passing data including unencoded data.

In one embodiment the NAI system 20 takes the form of a kit comprising of the controller 30, crankshaft sensor 40 (i.e., a sensor 40 adapted to fit and monitor the revolutions of the crankshaft of a fuel injected internal combustion engine 24), the throttle position sensor 50 (i.e., a sensor 50 adapted to fit and monitor the throttle body 55), power regulator 60, a compressor housing 110 with an electric motor 80 operably coupled to propeller 100, and at least one cross member 120. In a preferred embodiment, the at least one cross member 120 is adapted to hold securely the electric motor 80 and propeller 100 assembly along the central axis of the compressor housing 110. The kit may further comprise an engine temperature sensor 125 operably linked to the controller 30.

It should be understood that several of the components described in FIG. 2 could be integrated. For example, the controller 30 may be integrated with another member of the invention such as the power regulator 60.

Also, the power regulator 60 may be integrated into the design of the motor 80. In addition, the power regulator 60 may be adapted to receive AC current from the vehicle's alternator (not shown), wherein the power regulator 60 comprises a rectifying circuit to convert the AC to DC current. The power regulator 60 varying the amount of DC current, so rectified, delivered to the motor 80 in accordance with instructions received from the controller 30.

In a further embodiment, the regulator 60 is adapted to take both DC current from the battery 70 and AC current from the vehicle's alternator (not shown), a balancing circuit (not shown) integrated into the design of the regulator 60 is adapted to vary the amount of AC and DC current taken from the alternator and battery 70, respectively; for example, if the controller 30 instructs the regulator 60 to deliver power to the motor 80, but the engine revolutions are very low, then the balancing circuit would take more current from the battery 70 and less current from the alternator.

Figure 5:
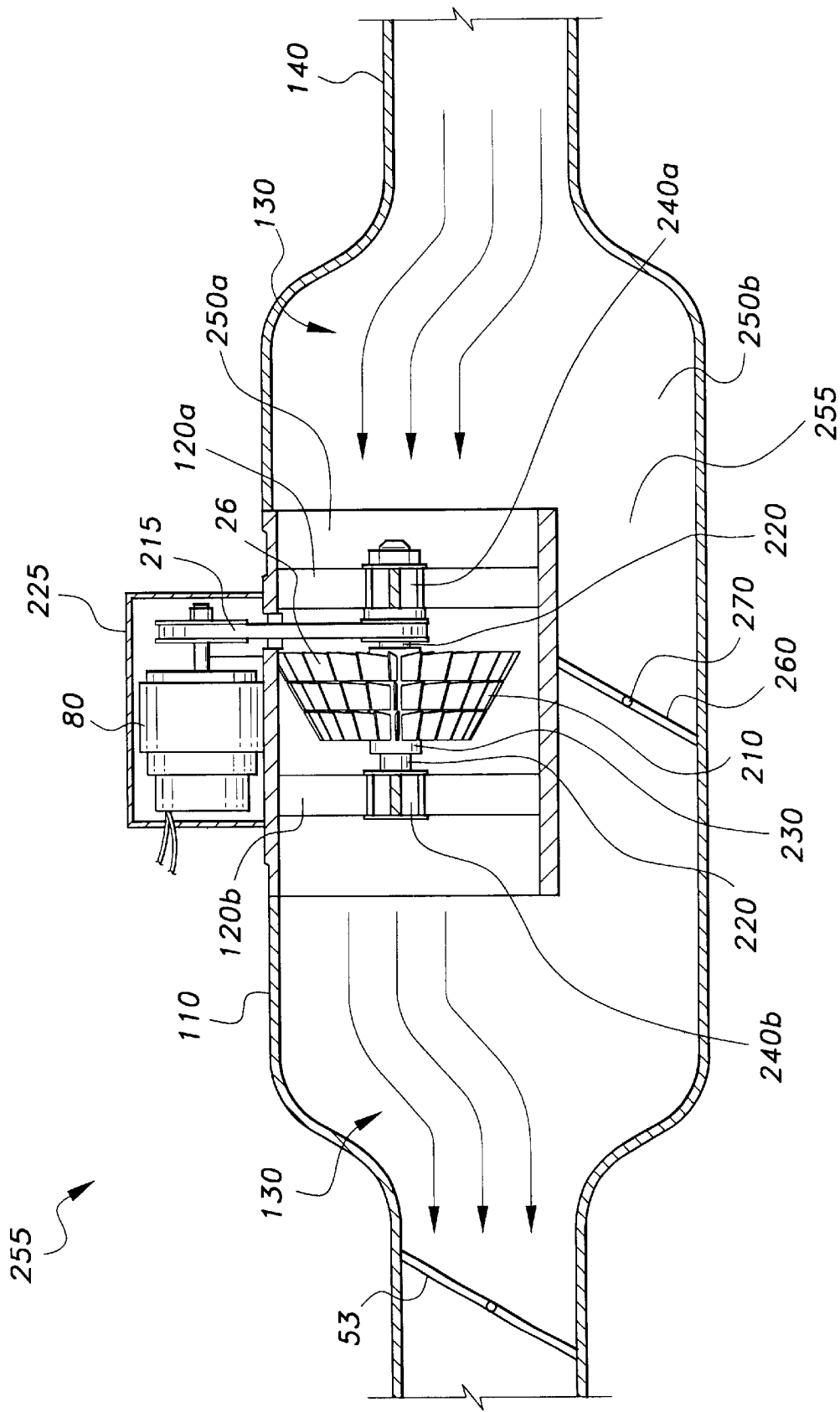
FIG. 5 is an enlarged section view of the compressor bypass duct.

The belt driver 215 is shown in e.g., FIG. 5, upstream of the compressor 100 on the air intake duct 140 side of compressor 100. It should be understood that the belt driver could be arranged to drive compressor rotor axle 220 on the duct 142 side of the compressor 100 and if so the electric motor housing 225 should be adapted to prevent compressed air leaking from passage 142 to the outside air which could otherwise result in inadvertent energy losses.

Referring specifically to Table 1 below, various scenarios conforming to the embodiment of the invention as depicted in FIG. 2 are summarized. In scenario #1 the engine speed is low and the throttle deflection is high; in this scenario the controller 30 sends a signal to the power regulator 60 to allow sufficient electric current to power the motor 80 thereby driving propeller 100 to compress and increase the airflow 130 to the engine 24. In scenario #5 the engine speed is low and the throttle deflection is low; the controller 30 sends a signal to the power regulator 60 to prevent sufficient electric current to power the motor 80 thereby not increasing the airflow 130 to the engine 24.

TABLE 1

| Scenario # | Engine Speed | Throttle Deflection | Compressor 26 |
| --- | --- | --- | --- |
| 1 | Low | High[3] | On-line |
| 2 | High[1] | High[3] | On-line |
| 3 | High[2] | High[3] | Off-line |
| 4 | High | Low[4] | Off-line |
| 5 | Low | Low[4] | Off-line |

[1] Engine speed is high but below maximum threshold value ($ES_{THRES}$).
[2] Engine speed is high and above maximum threshold value (ESTHRES).
[3] Throttle deflection is any value above minimum threshold value (TDTHRES).
[4] Throttle deflection is any value below a minimum threshold value ($TD_{THRES}$).

Figure 2A:
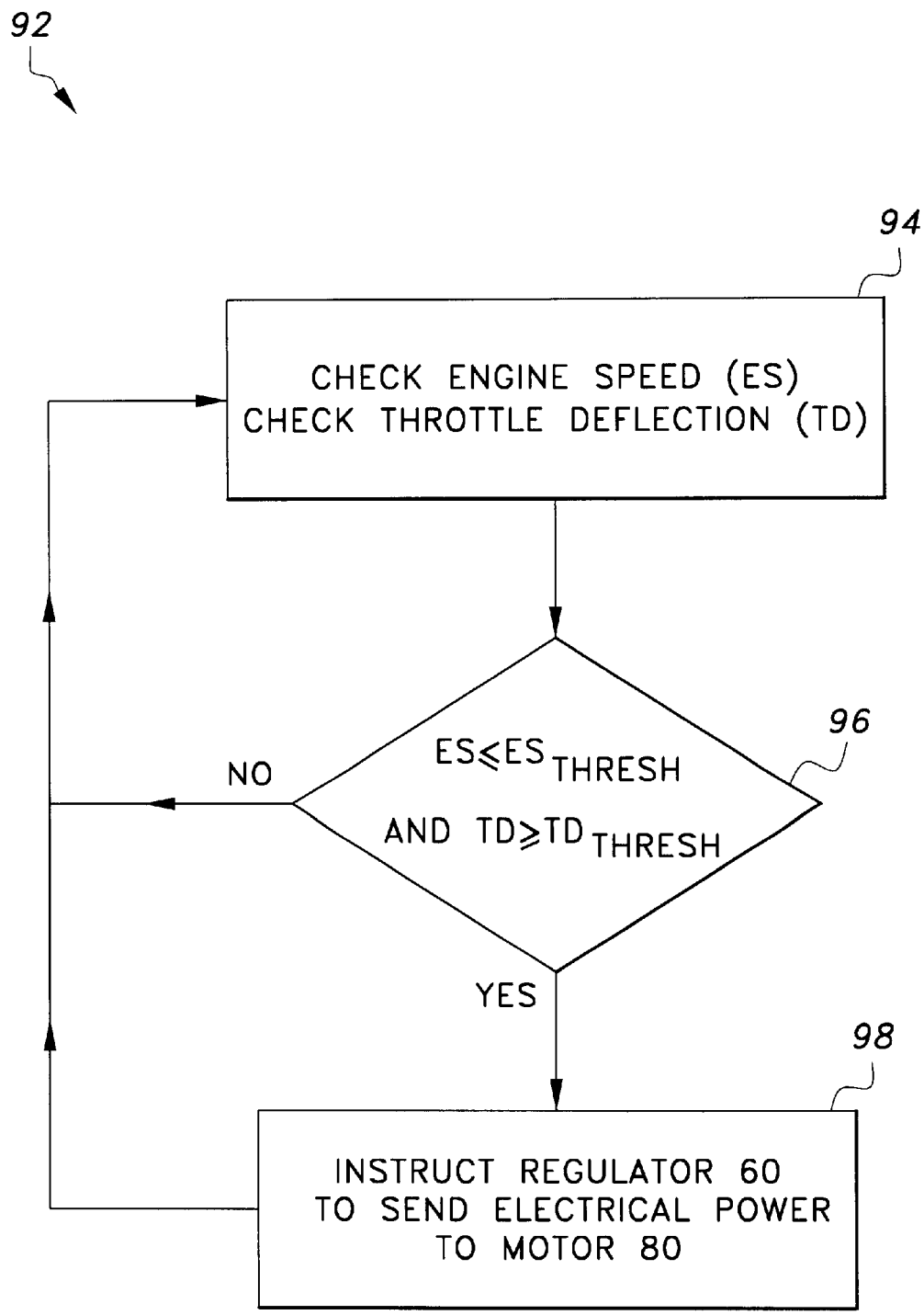
FIG. 2A is a flow chart depicting the logic steps performed by the controller according to one aspect of the invention.
Figure 2B:
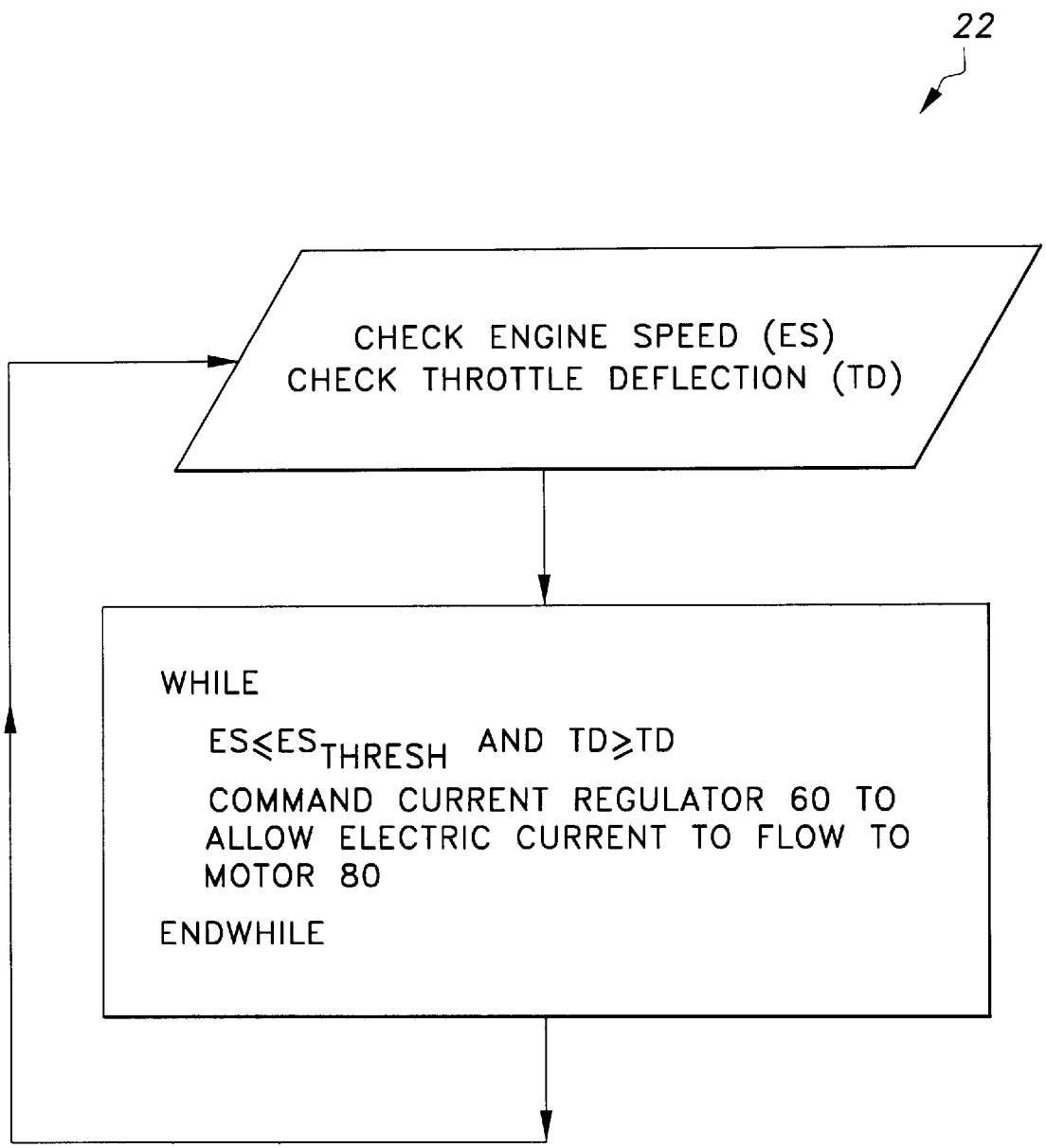
FIG. 2B is a flow chart depicting the logic steps performed by the controller according to another aspect of the invention.

FIG. 2A shows a flow chart 92 that depicts the logical steps of an embodiment of the control algorithm 22, depicted in FIG. 2B. The algorithm 22 directs the operations of the controller 30, which in turn selectively controls the operation of the compressor 26 by controlling the operation of the regulator 60. In this embodiment of the control algorithm 22, the regulator 60 is set to a default setting wherein the regulator 60 blocks electrical power to the motor 80 unless instructed by the controller 30 to send power to the motor 80 to drive the compressor 26. At 94 the controller 30 checks the status of engine speed ("ES") and throttle deflection ("TD") by monitoring sensors 40 and 50, respectively. The controller 30 checks at 96 to see if the engine speed is equal or less than a first predetermined threshold value ($ES_{THRESH}$), and if the throttle deflection is greater than or equal to a second predetermined threshold value ($TD_{THRESH}$), If the engine speed is equal or less than the first threshold value, and if the throttle deflection is greater than or equal to the second threshold value then the controller 30 instructs the regulator 60 at 98 to send electrical power to the motor. If the engine speed is not equal or less than a first threshold value, or if the throttle deflection is not greater than or equal to a second threshold value then the controller 30 repeat checks at 94 the status of engine speed ("ES") and throttle deflection ("TD") by monitoring sensors 40 and 50, respectively.

With respect to Table 1, the $TD_{THRESH}$ for a particular vehicle will depend on a number of factors peculiar to the type and model of vehicle. An arbitrary value of 50% deflection in the throttle 50 could be assigned to $TD_{TRESH}$. Thus, any throttle deflection ≧50% would be regarded as "High" with respect to column 3 (from the left) in Table 1 (the "Scenario" column being column 1), and any throttle deflection of less than 50% would be counted as "Low".

Still with respect to Table 1, while the $ES_{THRESH}$ for a particular vehicle will depend on a number of factors peculiar to the type and model of vehicle. An arbitrary crankshaft RPM equal or greater than 3,000 RPM could count as "High", and any RPM value below 3,000 counted as "Low" with respect to column 2 in Table 1.

The embodiment of the invention as depicted by FIG. 2A and Table 1 can be summarized as follows: while the engine speed (ES) is equal to or below a predetermined maximum threshold value ($ES_{THRES}$) AND the throttle deflection (TD) is equal or above a predetermined minimum threshold value ($TD_{THRESH}$) the controller 30 instructs the power regulator 60 to allow electric current to flow to the electric motor 80 to drive compressor 26 OTHERWISE controller 30 instructs power regulator 60 not to allow electric current to flow to the electric motor 80.

In another embodiment of the invention, a pair of electric motors may be used to drive the compressor 26 as described in the '038 patent. In this embodiment the controller 30 sends instructions to the power regulator 60 to connect or disconnect the electric motors from the battery 70 in accordance with the signals received from the sensors 40 and 50 reporting the status of the engine speed and throttle deflection, respectively.

Figure 3:
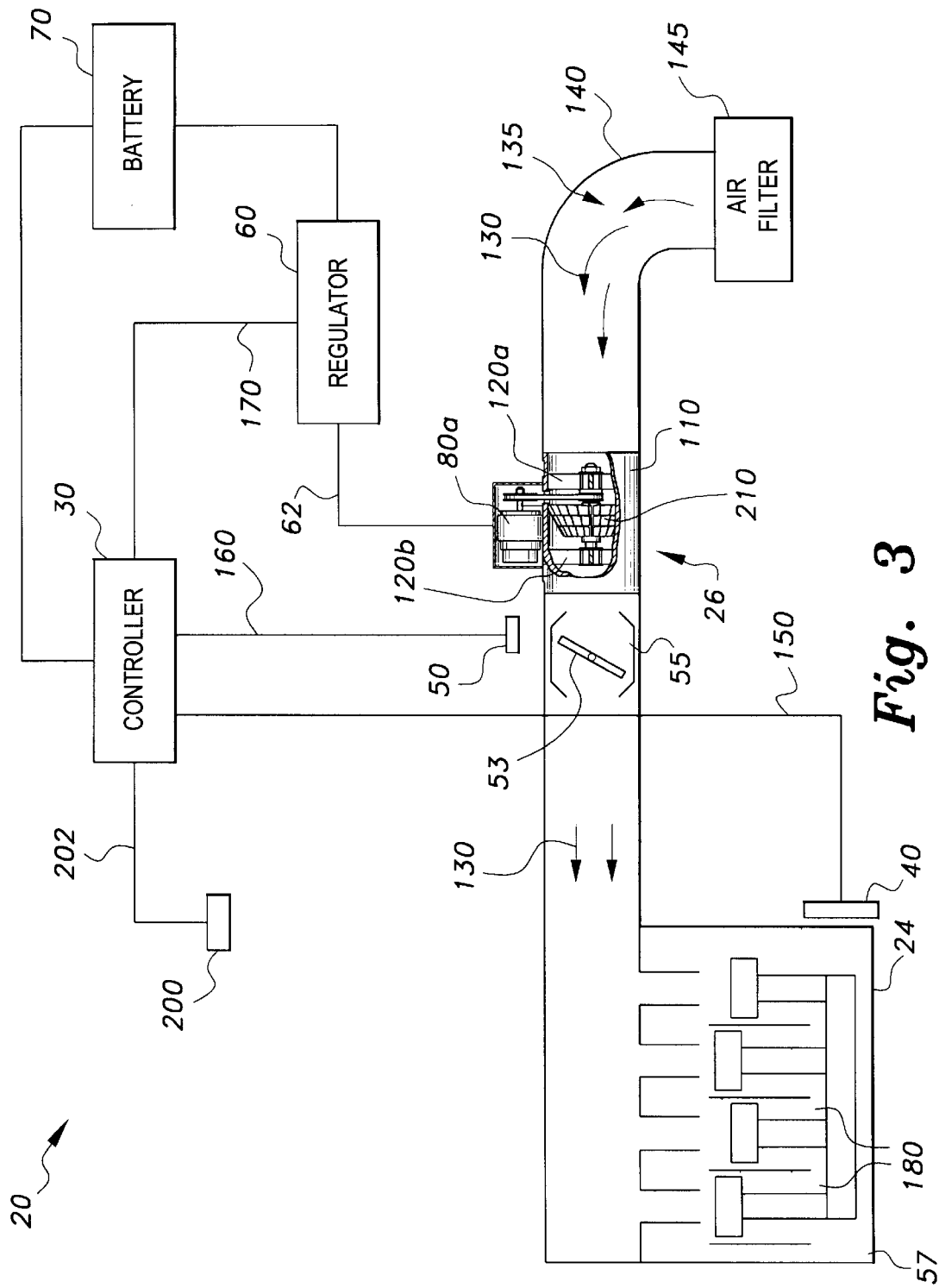
FIG. 3 is a schematic plan view of a nozzle air injection system for a fuel-injected engine according to the present invention with a rotatable compressor in communication with an electric motor via a drive belt, and under the direction of a controller box in communication with an engine speed, throttle position, and engine temperature sensors.
Figure 4:
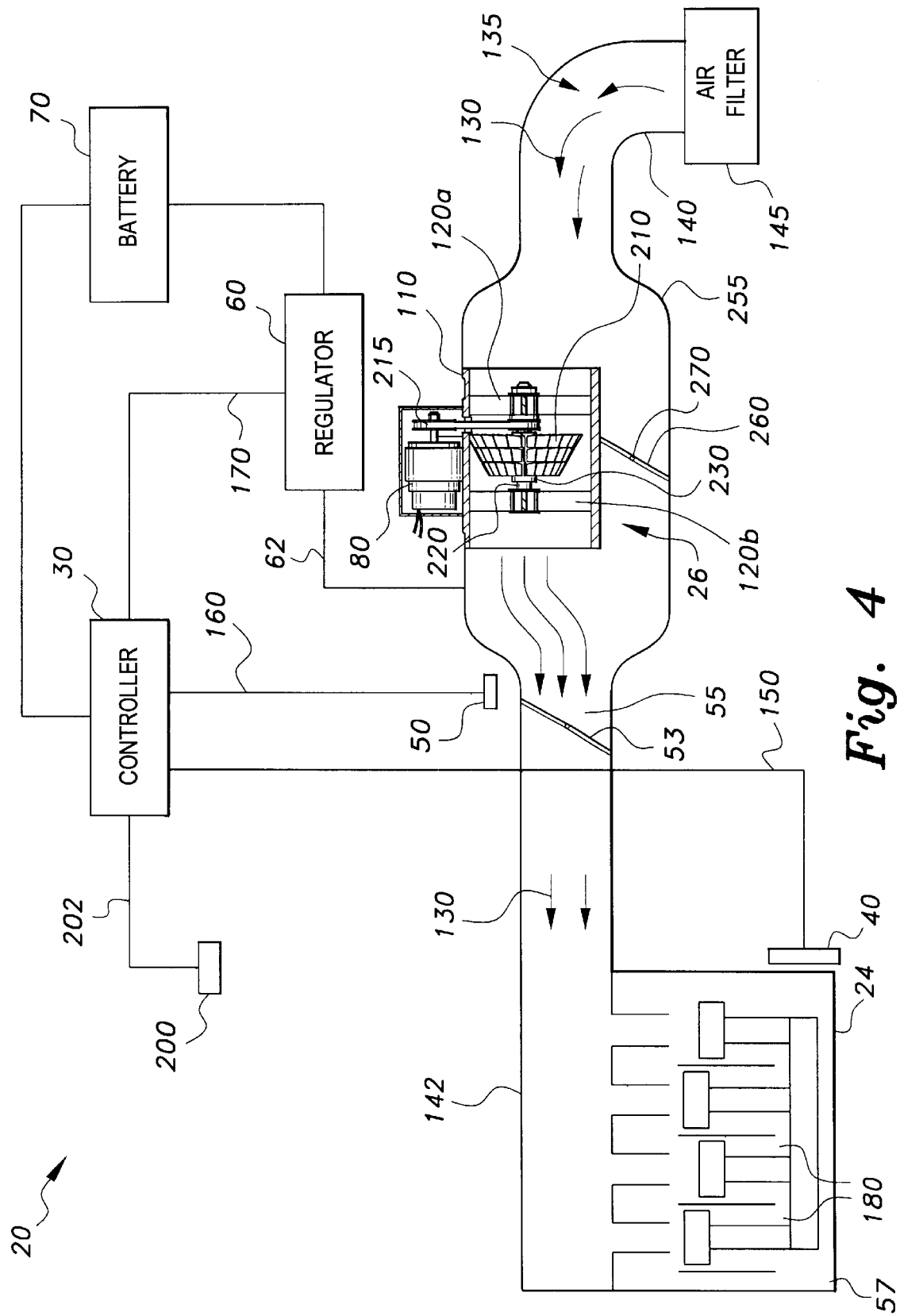
FIG. 4 is a schematic plan view of a nozzle air injection system for a fuel-injected engine according to the present invention with a compressor bypass passage.

In an alternative embodiment, the air compressor 26, is driven by one of a plurality of drive means as described U.S. Pat. No. 2,839,038 ("the '038 patent"), issued Jun. 17, 1958 to C. E. Middlebrooks Jr., which is incorporated by reference herein in its entirety. The preferred drive means is a single electric motor 80 mounted outside the compressor chamber housing 110 and communicates by means of a belt driver 215, as shown in FIGS. 3, and 4 of the present invention, with an air compressing means such as a turbo rotor 210 or an axle upon which is mounted at least one propeller 100.

While the specific drive means for powering the compressor 26 is not critical, and can be any suitable drive means known by persons of ordinary skill in the art, it is important that the drive means can be engaged or disengaged from the compressor 26 in accordance with instructions outputted from the controller 30.

If the compressor 26 is powered by an engine take off means should be adapted to incorporate an engagement and disengagement means in order to engage or disengage the takeoff means from the from the compressor 26 in accordance with instructions outputted from the controller 30.

For example, when the engine speed is low and the throttle deflection is high, the controller 30 would output instructions to the engagement and disengagement means to engage engine takeoff means to drive the compressor 26. Obviously, if the takeoff means was already engaged then the controller 30 instructions would not change the status of the takeoff means.

If the engine speed was high and the throttle deflection low then the controller 30 would instruct the engagement and disengagement means to disengage the engine takeoff means from driving the compressor 26. Obviously, if the takeoff means was already disengaged then the controller 30 instructions would not change the status of the takeoff means.

As described above, the specific drive means for powering the air compressor member 26 is not critical and can be any suitable drive means. For example, the air compressor member 26 may be powered by an engine takeoff means as shown in the '038 patent, except that the drive means should incorporate a disengagement or decoupling means operated by, e.g., an actuator under the control of the controller 30, wherein the air compressor member 26 is operatively decoupled from the drive means when the engine 24 is not under load.

In another embodiment of the present invention a method is provided for selectively compressing air to provide additional air to the fuel injected internal combustion engine to improve power output thereof, comprising the steps of: (1) providing a controller 30, wherein the control algorithm is stored on controller 30, further wherein the controller 30 generates instructions in response to the control algorithm; (2) providing an engine speed sensor (such as a crankshaft sensor 40) in communication with the controller 30, wherein the engine speed sensor 40 is adapted to collect and transmit throttle position data to the controller 30; (3) providing a throttle position sensor 50 in communication with the controller 30, wherein the throttle position sensor 50 is adapted to collect and transmit throttle position data to the controller 30; (4) providing an air compressor driving means; (5) providing a decoupling means; (6) providing a drive means actuator operably connected to the decoupling means and adapted to respond to instructions received from the controller 30; and (7) providing an air compressor connected to the driver means, wherein the driver means is adapted to drive the air compressor 26 to provide compressed air when engaged to the air compressor, wherein the controller is adapted to communicate instructions to the drive means actuator under the direction of the control algorithm 22, and wherein the controller 30 instructs the drive means actuator to engage the driver means to drive the air compressor to compress air if the engine speed is equal or below a predetermined engine speed threshold value ($ES_{THRESH}$) and if the throttle deflection is equal or above a predetermined throttle deflection threshold value ($TD_{THRESH}$) otherwise, the decoupling means disengages the driving means from the air compressor, thereby stopping the air compressor from compressing air.

For the purpose of clear description it should be understood that the engine speed might be determined by one of several means well known in the art of internal combustion engines. In the preferred embodiment the engine speed is determined using a crankshaft sensor 40 operably connected to crankshaft 32, wherein the crankshaft sensor 40 monitors the speed of the engine by measuring the revolutions of the crankshaft 32, e.g., the number of crankshaft revolutions per minute (RPM) of the engine 24.

The term "throttle deflection" is used herein to describe the amount by which the throttle 53 is open (or closed), thereby reflecting the amount by which the throttle body 55 is open to permit airflow 130 along air intake duct 140 in the direction of the engine 24. The status of throttle body 55 depends, at least in part, on the demand placed on the engine by the human operator. The throttle 53 is operably coupled either directly or indirectly to an accelerator pedal (not shown). Thus, the degree to which the throttle body 55 is open or closed would generally depend on the amount by which the human operator (i.e. driver of the vehicle) depresses the accelerator pedal (not shown).

FIG. 3 shows a NAI system 20 according to another embodiment of the invention. A controller 30 is connected to a crankshaft sensor 40, a throttle position sensor 50, a toggle preference switch 200, a power regulator 60 and battery 70. The power regulator 60 is further connected to an electric motor 80a and battery 70. The controller 30 monitors sensor signal inputs from the crankshaft sensor 40, throttle position sensor 50, and toggle switch 200; the toggle 200 is operably connected to the controller 30 via line 202. In response to the sensor signals the controller 30 adjusts the power regulator 60 thereby regulating the current delivered to the electric motor 80a from the battery 70. The electric motor 80a is operably coupled to an air compressor 26 (shown as a cut-away view), which comprises a turbine rotor 210 located inside air intake duct 140; the turbine rotor 210 communicates with the electric motor 80a by means of a belt driver 215. The compressor rotor 210 is fixed to a rotor axle 220 (visible in FIG. 5) by a rotor sleeve 230, and the entire compressor turbine rotor 210 is secured to the center of the compressor chamber housing 110 by means of a first and second cross members 120a and 120b and associated first and second cross member guides 240a and 240b.

Still referring to FIG. 3, the electric motor 80a is mounted external to the compressor housing 110 and duct 140 in contrast with the electric motor 80 in FIG. 2 where the electric motor 80 is located inside the compressor housing 110 which is continuous with air duct 140. Depending on the position of the throttle body 55, air 135 is directed through air filter 145 into air intake duct 140 and thence through turbine rotors 53, throttle body 55 and towards the combustion chambers 180 in engine 24. Electric current delivered to the motor 80a causes the turbine rotor 210 to turn and compress air 135 thereby increasing the density of the air 135 delivered to the combustion chambers 180 via duct 142.

Still referring to FIG. 3, air 135 is directed through air filter 145 into air intake duct 140, and thence past turbine rotor 210, throttle body 55 and towards the combustion chambers 180 in engine 24. Electric current is delivered to the motor 80a, via regulator 60 under the control of the controller 30, to drive the turbine rotor 210 to compress air 135, thereby increasing the amount of air delivered to the combustion chambers 180 via duct 142.

The toggle preference switch 200 may be located in any suitable place such as the dashboard of a vehicle where the driver can switch the toggle switch between on and off positions.

Figure 3A:
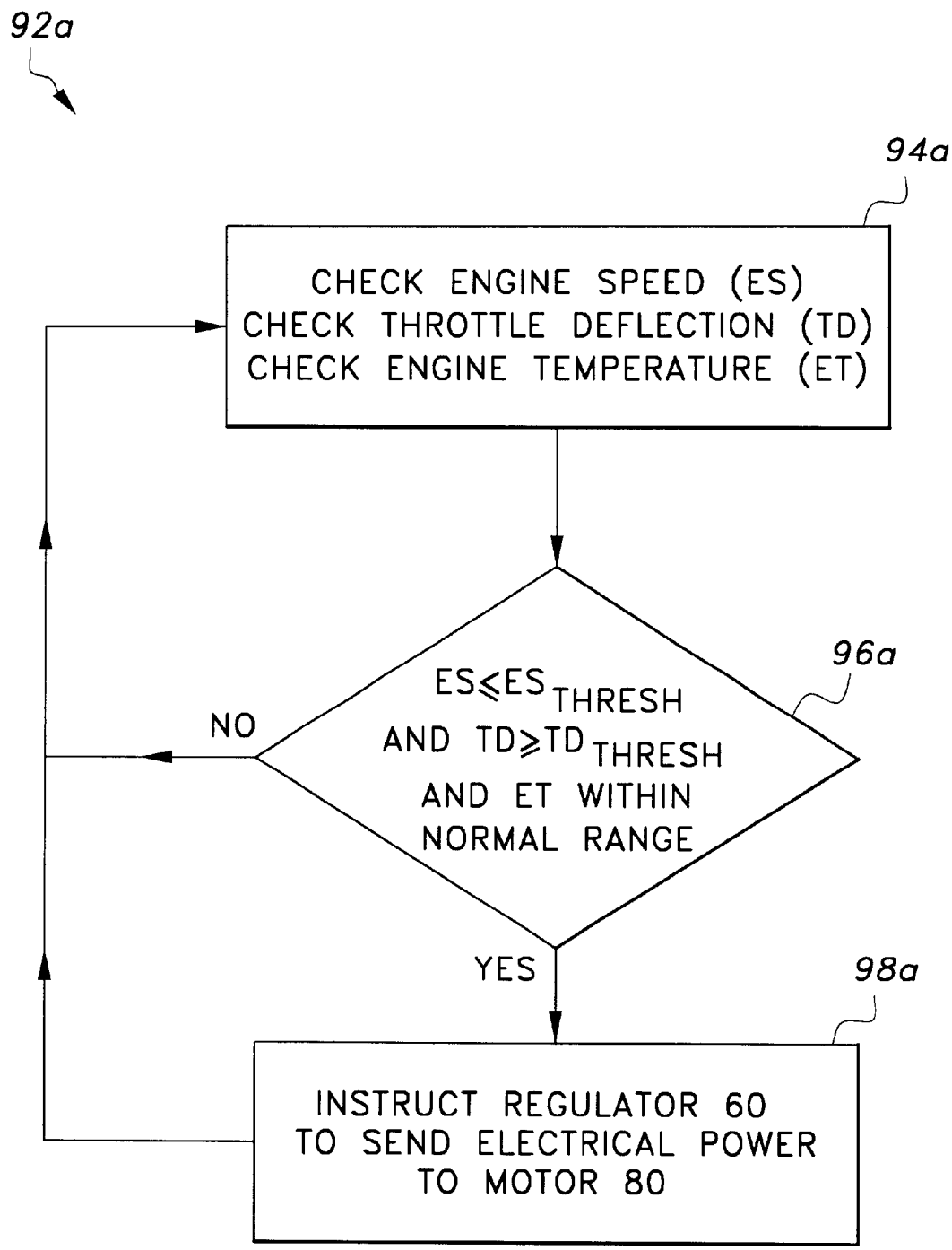
FIG. 3A is a flow chart depicting the logic steps performed by the controller according to one aspect of the invention.

FIG. 3A shows a flow chart 92a that depicts the logical steps of a further embodiment of the control algorithm 22. The algorithm 22 is performed by the controller 30. The algorithm controls the operation of the compressor 26 by controlling the operation of the regulator 60. In this embodiment, the regulator 60 is set to a default setting wherein the regulator 60 blocks electrical power to the motor 80 unless instructed by the controller 30 to send power to the motor 80 to drive the compressor 26. At 94a the controller 30 checks the status of engine speed ("ES"), the throttle deflection ("TD"), and the engine temperature ("ET") by monitoring sensors 40, 50 and 125, respectively. The controller 30 checks at 96a to see if the engine speed is equal or less than a first threshold value ($ES_{THRESH}$), that the throttle deflection is greater than or equal to a second threshold value ($TD_{THRESH}$), and if the engine temperature is within is within the normal operation range of the engine. If the engine speed is equal to or less than a first threshold value, and if the throttle deflection is greater than or equal to a second threshold value, and if the engine temperature is within the normal operation range, then the controller 30 instructs the regulator 60 at 98a to send electrical power to the motor. If the engine speed is not equal to or less than a first threshold value, or if the throttle deflection is not greater than or equal to a second threshold value, or if engine temperature is not within the normal operation range. then the controller 30 repeats the check at 94a of the status of engine speed ("ES") and throttle deflection ("TD") and the engine temperature ("ET") by monitoring sensors 40, 50 and 125, respectively.

With respect to FIGS. 4 and 5, the air intake duct 140 is split into a first sub-passage 250a and a second bypass passage 250b to provide a compressor bypass duct system 255; the sub-passages 250a and 250b extend slightly upstream and downstream of compressor 26, which in this embodiment is shown in passage 250a. A gate 260 may be used to selectively block and unblock the passage 250b. The gate 260 is shown to be a butterfly valve in FIGS. 3 and 4. The gate 260 may have an axle 270 running through a central region of the gate 260. The axle 270 may extend from the gate 260 through the passage 250b, to an actuator (not shown) for the gate 260 outside of the bypass passage 250b. The gate actuator may comprise a solenoid, air, vacuum, hydraulic, electronic, or other type of actuation device. The gate actuator may be operably linked to the gate 260 so that it can rotate the gate 260 in the passage 250b between blocking and unblocking positions. In alternative embodiments, the gate 260 may be provided by a sliding gate, flapper, iris type, rotary, or any other means for selectively blocking the flow of air 135 through the passage 250b. When the gate 260 is in a blocking position, airflow 130 is directed to sub-passage 250a and thence into and through the rotor 210 of compressor 26. When the gate 260 is in an unblocking position, airflow 130 is directed through bypass passage 250b and thence bypasses compressor 26. The position of the gate 260 varies according to instructions sent by controller 30 to the gate actuator (not shown) to move the gate 260 between blocking and unblocking positions.

Still referring to FIGS. 4 and 5, the gate 260 is shown in a blocking position thereby directing airflow 130 through the compressor 26 in sub-passage 250a. It is important that the gate 260 be able to withstand back-pressure generated when the airflow 130 is directed through the compressor 26.

A second gate (not shown in FIG. 4) could optionally be placed slightly upstream of the compressor 26 in sub-passage 250a and proximate to duct 140. The second gate may be operably linked to a further actuator also under the control of controller 30 such that when gate 260 is in the blocked position, the second gate is in the open or unblocked position; and when gate 260 is in the unblocked position then the second gate is in the blocked position. The exact arrangement of actuators to open or close the gates is not important so long as the gates operate cooperatively to permit free flow of air 135 either along sub-passage 250a and thence through the compressor 26, or along bypass passage 250b when the compressor 26 is not online.

Referring specifically to Table 2 below, various scenarios conforming to the embodiment of the invention as depicted in FIG. 4 are shown. In scenario #1 the engine speed is low and the throttle deflection is high; in this scenario the controller 30 sends a signal to the power regulator 60 to allow sufficient electric current to power the motor 80 thereby bringing air compressor 26 online to increase the airflow 130 to the engine 57, and a signal to the gate 260 actuator to place the gate 260 in a blocking position to block sub-passage 250b.

Still referring to Table 2, in scenario #4 the engine speed is low and the throttle deflection is low; the controller 30 sends a signal to the power regulator 60 to prevent sufficient electric current to power the motor 80, and gate 260 actuator is instructed to open gate 260 thereby unblocking sub-passage 250b. If an optional second gate is located in passage 250a the controller 30 sends a signal to the second gate actuator to block passage 250a to further ensure that the airflow 130 bypasses the compressor 26 via bypass passage 250b. However, it is not critical that a second gate is fitted to passage 250a so long as gate 260 is in the unblocked position when no power is directed to rotate compressor 26.

The embodiment of the invention as depicted in Table 2 can be summarized as follows: while the engine speed is below a predetermined maximum threshold value ($ES_{THRES}$) AND the throttle deflection is above a predetermined minimum threshold value ($TD_{THRESH}$) the controller 30 instructs the power regulator 60 to allow electric current to flow to the electric motor 80 to drive compressor 26 and controller 30 instructs the bypass passage actuator controlling gate 260 to adopt a blocking position to close off bypass passage 250b OTHERWISE controller 30 instructs power regulator 60 not to allow electric current to flow to the electric motor 80 and controller 30 instructs the bypass passage actuator (not shown) to move the gate 260 into an unblocked or open position to open bypass passage 250b to air 135.

The act of unblocking passage 250b is somewhat akin to removing a high resistance resistor in a parallel circuit comprising a first and second resistors in parallel. Removing one of the two parallel resistors allows free flow of electricity around the circuit even though one resistor remains in place. So it is with the bypass 255 when the gate 260 in bypass passage 250b is open when the compressor 26 (in sub-passage 250a) is not rotating (i.e. offline because the regulator 60 is not supplying electricity to the motor 80, which is thereby stopped from rotating the rotor 210); thus, a further gate in sub-passage 250a is not necessary, but may be fitted to sub-passage 250a if desired.

TABLE 2

| Scenario # | Engine Speed | TD | Compressor 26 | Bypass passage 250b |
|---|---|---|---|---|
| 1 | Low | High[3] | On-line | blocked |
| 2 | High[1] | High[3] | On-line | blocked |
| 3 | High[2] | High[3] | Off-line | unblocked |
| 4 | High | Low[4] | Off-line | unblocked |
| 5 | Low | Low[4] | Off-line | unblocked |

TD = throttle deflection.
[1]Engine speed is high but below maximum threshold value ($ES_{THRES}$).
[2]Engine speed is high and above maximum threshold value ($ES_{THRES}$).
[3]Throttle deflection is any value above minimum threshold value ($TD_{THRES}$).
[4]Throttle deflection is any value below a minimum threshold value ($TD_{THRES}$).

Figure 6:
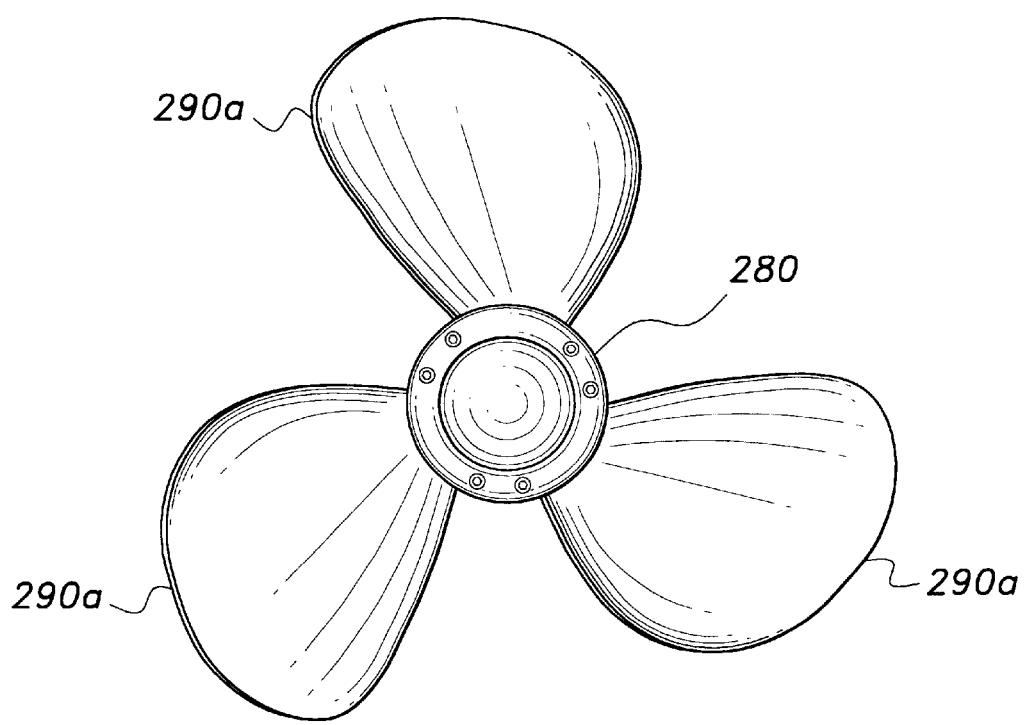
FIG. 6 is a front perspective view of a variable pitch propeller in a non-feathered position according to one aspect of the invention.
Figure 7:
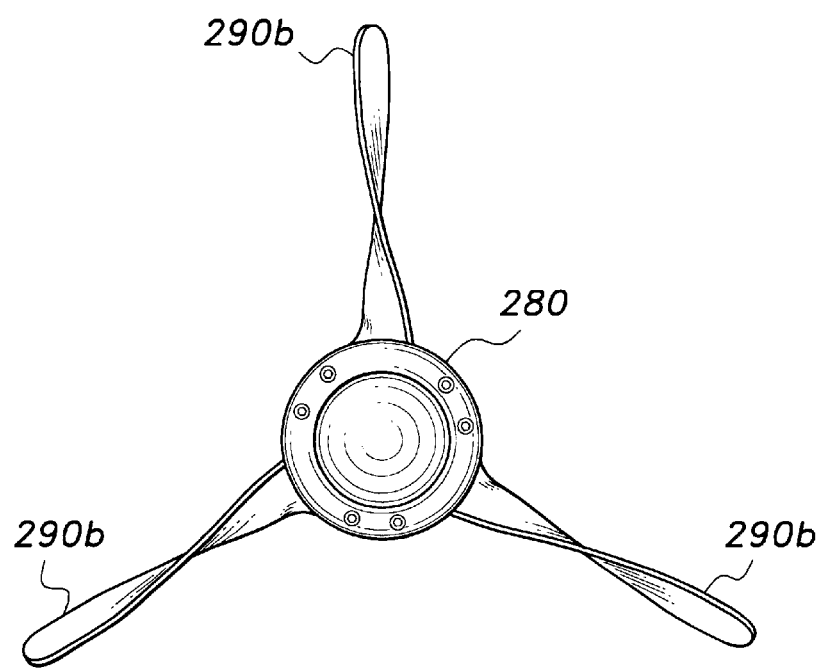
FIG. 7 is a front perspective view of a variable pitch propeller in a feathered position according to one aspect of the invention.

FIG. 6 shows a variable pitch propeller ("VPF propeller") 280 comprising VPF blades 290a capable of being selectively pitched between a non-feathered pitch position as shown in FIG. 6 and a feathered pitch (i.e., zero pitch) position as shown by feathered VPF blades 290b in FIG. 7. In one embodiment of the invention, the propeller 100 is replaced with at least one VPF blade 280. Thus, when the blades 290 are feathered as shown in FIG. 7 the airflow 130 is least disrupted by the feathered blades 290b, i.e., the drag penalty is negligible since the blades 290b are end on with respect to the airflow 130. Thus, when a VPF propeller 280 is used in place of e.g., rotor 210, any requirement for a compressor bypass 255 is substantially obviated.

When the blades 290 are in the non-feathered position as shown in FIG. 6, the drag is considerable, but is of no consequence since the blades 290a would only be in the non-feathered position when the VPF propeller is rotating and positively compressing the air 135 in accordance with instructions from controller 30 received by a actuator or mechanism (not shown) for varying the pitch of the blades 290. The method of varying the pitch of the blades 290 of a VPF propeller 280 is well known and details may be found, for example, in U.S. Pat. No. 4,047,842 ("the '842") issued Sep. 13, 1977 to S. Avena et al., which describes a variable pitch mechanism for fan blades; the '842 is incorporated herein by reference in its entirety.

Figure 8:
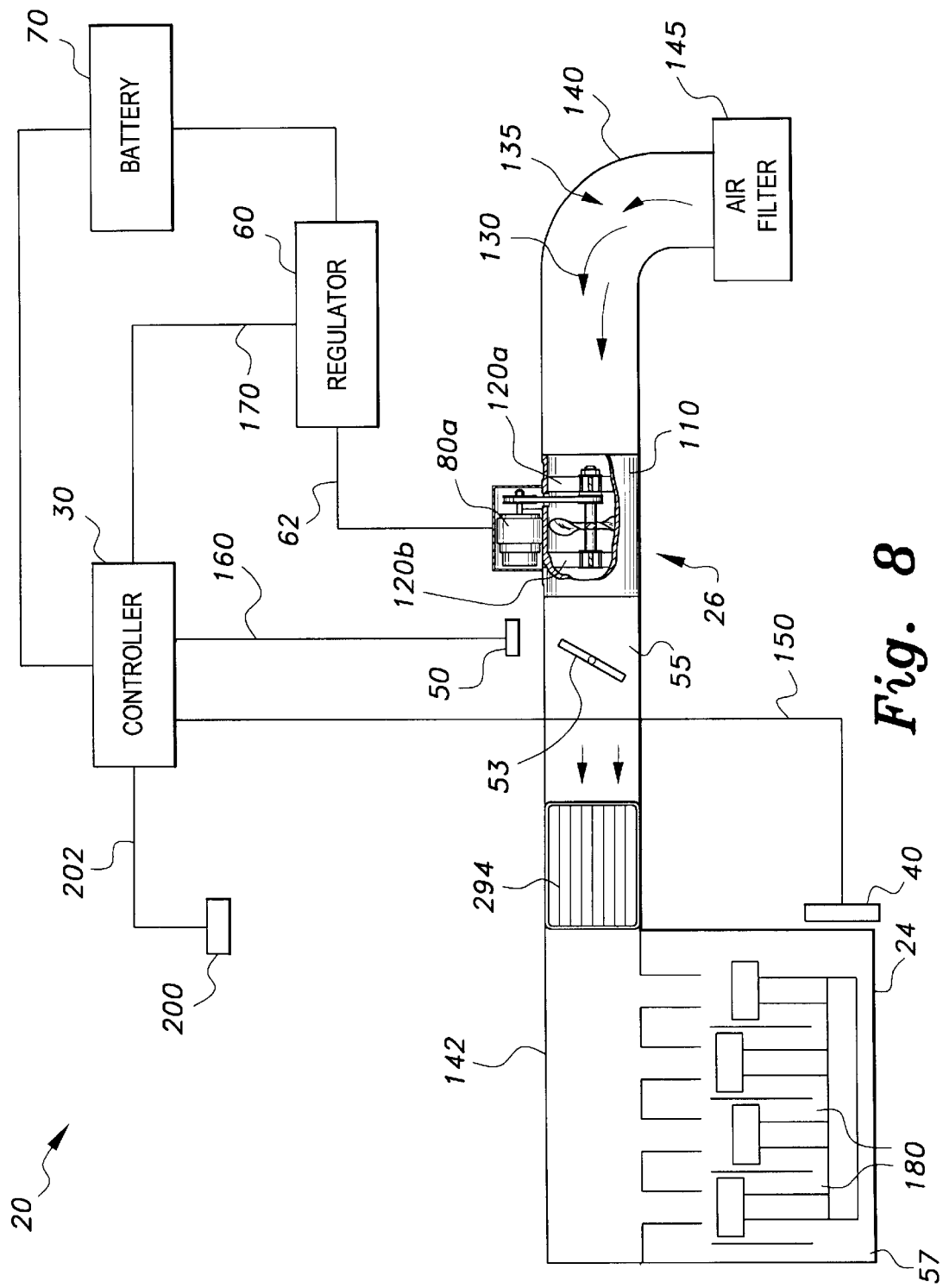
FIG. 8 is a schematic plan view of a nozzle air injection system for a fuel-injected engine according to the present invention with a compressor comprising at least one variable pitch propeller.

Referring to FIG. 8, the turbine rotor 210 (as shown in FIGS. 2, 3, and 4 of the present invention) is replaced with at least one VPF propeller 280 and a variable pitch control mechanism operably connected to controller 30. In a further embodiment the pitch angles of the blades 290 can be selected between the full non-feathered position of FIG. 6 and the full feathered position of FIG. 7. Thus, it should be apparent that the degree of compression of the air 135 can vary at constant RPM of the VPF propeller according to the pitch of the blades 290, under the control of controller 30. Thus, by replacing the turbine rotor 210 of e.g. FIG. 3 with the VPF propeller 280, the compression of the air 135 for a given RPM of motor 80a can be varied in accordance with the pitch angle (i.e., angle of attack) of the blades 290 of the VPF propeller 280 while keeping the RPM of the motor 80a constant. Thus, the controller 30 could set the RPM of VPF propeller 280 and motor 80a to a constant value, thereby avoiding wear and tear caused when the RPM of the compressor 26 is varied. Such flexibility permits the controller 30 to be programmed with a selection of the most efficient RPM values with respect to the VPF propeller member 280 of the air compressor 26. Likewise, at low VPF propeller 280 the pitch of the blades 290 can be set to a high value to increase the angle of attack of the blades 290, thereby increasing the compression of the air 135 even at low RPM values of the VPF propeller 280.

Referring specifically to Table 3 below, various scenarios are summarized conforming to the embodiment of the invention in which the compressor 26 comprises a set of variable geometry blades 290 or, in the alternative, at least one variable pitch feathering propeller 280, as depicted in FIG. 8, operably coupled to a feathering actuator (not shown). In scenario #1 the engine speed is low and the throttle deflection is high; in this scenario the controller 30 sends a signal to the power regulator 60 to allow sufficient electric current to power the motor 80, thereby bringing air compressor 26 online to increase the airflow 130 to the engine 24; in addition, the controller 30 instructs the feathering actuator to adjust the variable geometry blades 290 to the non-feathered position. In scenario #4 the engine speed is high and the throttle deflection is low; the controller 30 sends a signal to the power regulator 60 to prevent sufficient electric current to power the motor 80, and a signal to the feathering actuator to adjust the variable geometry blades 290 to the feathered position (see FIG. 7) to allow air to flow around the blades 290b, thereby avoiding the possibility of drag on the blades 290. The use of variable geometry blades 290 thereby obviates any requirement to use the bypass passage 255, sub-passage 250b, and gate apparatus 260.

The embodiment of the invention as depicted in Table 3 can be summarized as follows: while the engine speed is below a maximum threshold value ($ES_{THRES}$) AND the throttle deflection is above a minimum threshold value ($TD_{THRESH}$), the controller 30 instructs the power regulator 60 to allow electric current to flow to the electric motor 80 to drive compressor 26, and controller 30 instructs the variable blade geometry actuator to set the variable geometry blades 290 to a non-feathered position OTHERWISE controller 30 instructs power regulator 60 not to allow electric current to flow to the electric motor 80, and controller 30 instructs the variable blade geometry actuator 290 to set the variable geometry blades 290 to adopt a feathered position.

Referring specifically to Table 4 below, various scenarios conforming to a further embodiment of the invention are summarized. In scenario #1 the engine temperature is normal, engine speed is low and the throttle deflection is high; in this scenario the controller 30 sends a signal to the power regulator 60 to allow sufficient electric current to power the motor 80, thereby bringing air compressor 26 online to increase the airflow 130 to the engine 24. In scenario #3 the engine temperature is high, engine speed is low and the throttle deflection is high; the controller 30 sends a signal to the power regulator 60 to prevent sufficient electric current to power the motor 80, thus keeping the compressor 26 off-line.

TABLE 3

| Scenario # | Engine Speed | TD | Compressor 26 | Variable Geometry Blades 290 |
|---|---|---|---|---|
| 1 | Low | High[3] | On-line | not feathered |
| 2 | High[1] | High[3] | On-line | not feathered |
| 3 | High[2] | High[3] | Off-line | feathered |
| 4 | High | Low[4] | Off-line | feathered |
| 5 | Low | Low[4] | Off-line | feathered |

TD = throttle deflection.
[1]Engine speed is high but below maximum threshold value ($ES_{THRES}$).
[2]Engine speed is high and above maximum threshold value ($ES_{THRES}$).
[3]Throttle deflection is any value above minimum threshold value ($TD_{THRES}$).
[4]Throttle deflection is any value below a minimum threshold value ($TD_{THRES}$).

Still referring to Table 4, if a bypass passage 255 and gate 260 were also present as shown in FIG. 5 then, for example, in scenario #4 in Table 4 the controller 30 would also send a signal to the gate 260 actuator to adopt a non-blocking position to permit the airflow 130 to travel freely along the bypass passage 250b, thereby avoiding the possibility of drag on the blades of the turbine rotor 210 of the compressor 26.

Still referring to Table 4, if variable geometry blades 290 were fitted to the compressor 26 then, for example, in scenarios #1 and #2 in Table 4, the controller 30 would instruct the variable blade geometry actuator to set the variable geometry blades 290 to a non-feathered position as depicted in FIG. 6 to allow the blades 290 to compress the air 135 and thereby increase airflow 130. In contrast, in scenarios #3 and #4, the controller 30 would instruct the variable blade geometry actuator to set the variable geometry blades 290 to a feathered position as depicted in FIG. 7.

The embodiment of the invention as depicted in Table 4 can be summarized as follows: while the engine temperature is within the normal operation range AND engine speed is below a maximum threshold value ($ES_{THRES}$) AND the throttle deflection is above a minimum threshold value ($TD_{THRESH}$), the controller 30 instructs the power regulator 60 to allow electric current to flow to the electric motor 80 to drive compressor 26 OTHERWISE controller 30 instructs power regulator 60 not to allow electric current to flow to the electric motor 80.

TABLE 4

| Scenario # | Engine Temperature | Engine Speed | TD | Compressor 26 |
|---|---|---|---|---|
| 1 | Normal | Low | High[3] | On-line |
| 2 | Normal | High[1] | High[3] | On-line |
| 3 | High[5] | Low | High[3] | Off-line |
| 4 | High[5] | High[1] | High[3] | Off-line |

TD = throttle deflection.
[1]Engine speed is high but below maximum threshold value ($ES_{THRES}$).
[2]Engine speed is high and above maximum threshold value ($ES_{THRES}$).
[3]Throttle deflection is any value above minimum threshold value ($TD_{THRES}$).
[4]Throttle deflection is any value below a minimum threshold value ($TD_{THRES}$).
[5]Engine temperature is above maximum threshold value ($ET_{THRES}$).

It should be understood that when the compressor 26 is being driven by motor 80, the RPM of the compressor rotor 210, or its functional equivalent, should be sufficient to impart positive motion on the fluid flow, i.e. air flow 130.

In a further embodiment of the invention, the invention comprises a compressed air cooler 294, shown as an aftercooler 294 in FIG. 8, for cooling air from compressor 26. In one embodiment, the air-cooler 294 is adapted to be fitted to duct 142, preferably proximate to throttle body 55, but otherwise preferably interposed between compressor 26 and the engine 24 to provide cooling of the air after compression by compressor 26 and prior to entry into the combustion cylinders of the engine 24. The air cooler would thereby increase air-density of the compressed air along duct 142 prior to entry into the engine's 24 combustion cylinders. Cooled air is less likely to cause premature ignition and combustion.

Coolers for cooling compressed air are well known in the art and involve, for example, utilizing heat exchangers that may employ air flow or coolant fluid or pressurized water droplets sprayed into the compressed air to vaporize and thereby absorb latent heat of vaporization from the compressed air, thereby cooling and increasing air density of the compressed air. It is preferred that air flow cooling using at least one air cooled radiator be used, since the air used for cooling the air-cooler radiator is at ambient temperature, as opposed to engine coolant fluid, which might be at a higher temperature than ambient air temperature. In an alternative embodiment, the air-cooler 294 may be integrated into the design of the air compressor 26 so that the air 135 is continuously cooled as it is compressed by the compressor 26. In a further embodiment, the compressed air cooler 294 is linked to the controller 30 such that the air cooler 294 only operates if the compressor 26 is operating.

It should be understood that intricate details of how the logic steps of algorithm 22 described above are implemented are not critical providing that the programming language and software coding is compiled and designed to replicate the spirit of the logic steps of the present invention as described herein. In addition, it is to be understood that the present invention is not limited to the embodiments described above, but encompasses any and all embodiments within the scope of the following claims.

I claim:

1. A nozzle air injection system adapted to selectively provide compressed air to a fuel-injected engine, thereby improving power output from the engine, comprising:
   a controller, wherein a control algorithm is stored on said controller, further wherein said controller operates in response to said control algorithm;
   an engine speed sensor in communication with said controller, wherein said engine speed sensor collects engine speed data and communicates said speed data to said controller;
   a throttle position sensor in communication with said controller, wherein said throttle position sensor collects throttle position data and communicates said throttle position data to said controller;
   a power regulator in communication with and under the control of said controller;
   an electric motor in electrical communication with said power regulator; and
   an air compressor connected to said electric motor,
   wherein said controller is adapted to communicate instructions to said power regulator under the direction of said control algorithm,
   wherein said power regulator is in communication with an electrical power source, said regulator is adapted to send or cut off a varying electrical current to said motor according to instructions received from said controller.

2. The nozzle air injection system according to claim 1, wherein said controller further comprises memory and a microprocessor for running said control algorithm.

3. The nozzle air injection system according to claim 1, wherein an engine temperature sensor is in communication with said controller.

4. The nozzle air injection system according to claim 1, wherein said compressor comprises at least one set of variable pitch blades operably coupled to at least one actuator, wherein said at least one actuator is operably linked to said controller, and wherein said at least one actuator is adapted to respond to control instructions received from said controller.

5. The nozzle air injection system according to claim 1, further comprising a compressor bypass passage adapted to accommodate a gate, wherein said gate is operably coupled to an actuator, wherein said actuator is in communication with and under the control of said controller.

6. The nozzle air injection system according to claim 1, wherein said controller and regulator are integrated to form a combined controller-regulator member.

7. The nozzle air injection system according to claim 1, wherein the nozzle air injection system is fitted to a fuel injected engine to provide a fuel injected engine and nozzle air injection system combination.

8. The nozzle air injection system according to claim 7, further comprising an air cooler disposed between the compressor and the fuel injected engine to provide air cooling.

9. A method for selectively compressing air to provide additional air to a fuel injected internal combustion engine to improve power output thereof, comprising the steps of:
   receiving an engine speed input;
   receiving a throttle deflection input; and
   supplying electrical power to an electric motor if said engine speed is equal or below a predetermined engine speed threshold value and if said throttle deflection is equal or above a predetermined throttle deflection threshold value;
   wherein said motor is coupled to an air compressor such that when electrical power is supplied to said motor it drives said air compressor which compresses air for delivery to a fuel injected internal combustion engine thereby improving power output thereof.

10. The method for selectively compressing air according to claim 9, further comprising the additional steps of receiving an engine temperature input, wherein the step of supplying electrical power to an electric motor occurs when said engine speed is equal or below a predetermined engine speed threshold value and if said throttle deflection is equal or above a predetermined throttle deflection threshold value and if said engine temperature is within a predetermined range of temperature.

11. The method for selectively compressing air according to claim 9, further comprising the additional step of reducing the surface contact area of the compressor blades with respect to airflow whenever electric motor coupled to the air compressor is not receiving electrical power.

12. A method for selectively compressing air to provide additional air to a fuel injected internal combustion engine to improve power output thereof, comprising the steps of:
   providing a controller, wherein a control algorithm is stored on said controller, further wherein said controller generates instructions in response to said control algorithm;
   providing an engine speed sensor in communication with said controller, wherein said engine speed sensor collects engine speed data and communicates said speed data to said controller;
   providing a throttle position sensor in communication with said controller, wherein said throttle position sensor collects throttle position data and communicates said throttle position data to said controller;
   providing an air compressor driving means;
   providing a decoupling means;
   providing an actuator in communication with said decoupling means and said controller; and providing an air compressor connected to said driver means, wherein said driver means drives said air compressor to provide compressed air when engaged to said air compressor,
   wherein said controller is adapted to communicate instructions to said actuator under the direction of said control algorithm, and
   wherein said controller instructs said actuator to engage said driver means to drive said air compressor to compress air if said engine speed is equal or below a predetermined engine speed threshold value and if said throttle deflection is equal or above a predetermined throttle deflection threshold value otherwise said decoupling means disengages said driving means from said air compressor thereby stopping said air compressor compressing air.

* * * * *